US011710300B2

(12) United States Patent
Shor et al.

(10) Patent No.: US 11,710,300 B2
(45) Date of Patent: Jul. 25, 2023

(54) COMPUTING SYSTEMS WITH MODULARIZED INFRASTRUCTURE FOR TRAINING GENERATIVE ADVERSARIAL NETWORKS

(71) Applicant: Google LLC, Mountain View, CA (US)

(72) Inventors: Joel Shor, San Francisco, CA (US); Sergio Guadarrama Cotado, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 1197 days.

(21) Appl. No.: 16/159,093

(22) Filed: Oct. 12, 2018

(65) Prior Publication Data

US 2019/0138847 A1 May 9, 2019

Related U.S. Application Data

(60) Provisional application No. 62/582,142, filed on Nov. 6, 2017.

(51) Int. Cl.
*G06V 10/82* (2022.01)
*G06F 9/448* (2018.01)
*G06N 3/08* (2023.01)
*G06N 3/084* (2023.01)
*G06F 18/40* (2023.01)
*G06F 18/2413* (2023.01)
*G06N 3/045* (2023.01)
(Continued)

(52) U.S. Cl.
CPC .............. *G06V 10/82* (2022.01); *G06F 9/448* (2018.02); *G06F 18/2414* (2023.01);
(Continued)

(58) Field of Classification Search
CPC ...... G06N 3/0454; G06N 3/0472; G06N 3/08; G06N 3/084; G06N 3/082; G06V 10/82; G06K 9/6253; G06K 9/6273; G06F 9/448
See application file for complete search history.

(56) References Cited

U.S. PATENT DOCUMENTS

| 2007/0094647 | A1* | 4/2007 | Meijer | ...................... G06F 8/44 |
| | | | | 717/140 |
| 2018/0176570 | A1 | 6/2018 | Rippel et al. | |

(Continued)

FOREIGN PATENT DOCUMENTS

CN 107293289 10/2017

OTHER PUBLICATIONS

Abadi et al. "Tensorflow: Large-scale machine learning on heterogeneous distributed systems." arXiv preprint arXiv: 1603.04467 (2016). (Year: 2016).*

(Continued)

*Primary Examiner* — Boubacar Abdou Tchoussou
(74) *Attorney, Agent, or Firm* — Dority & Manning, P.A.

(57) ABSTRACT

Computing systems that provide a modularized infrastructure for training Generative Adversarial Networks (GANs) are provided herein. For example, the modularized infrastructure can include a lightweight library designed to make it easy to train and evaluate GANs. A user can interact with and/or build upon the modularized infrastructure to easily train GANs. The modularized infrastructure can include a number of distinct sets of code that handle various stages of and operations within the GAN training process. The sets of code can be modular. That is, the sets of code can be designed to exist independently yet be easily and intuitively combinable. Thus, the user can employ some or all of the sets of code or can replace a certain set of code with a set of custom-code while still generating a workable combination.

19 Claims, 6 Drawing Sheets

(51) Int. Cl.
*G06N 3/047* (2023.01)
*G06N 3/082* (2023.01)

(52) U.S. Cl.
CPC ............ *G06F 18/40* (2023.01); *G06N 3/045* (2023.01); *G06N 3/047* (2023.01); *G06N 3/08* (2013.01); *G06N 3/084* (2013.01); *G06N 3/082* (2013.01)

(56) References Cited

U.S. PATENT DOCUMENTS

2018/0176576 A1* 6/2018 Rippel .................... G06V 10/82
2018/0336439 A1* 11/2018 Kliger .................... G06N 3/088

OTHER PUBLICATIONS

Arjovsky et al. "Wasserstein generative adversarial networks" In International conference on machine learning Jul. 17, 2017 (pp. 214-223). (Year: 2017).*

Chen et al., "InfoGAN: Interpretable Representation Learning by Information Maximizing Generative Adversarial Nets", arXiv:1606.03657v1, Jun. 12, 2016, 14 pages.

Goodfellow et al., "Generative Adversarial Networks", arXiv:1406.2661v1, Jun. 10, 2014, 9 pages.

Mxnet, Generative Adversarial Networks, https://mxnet.incubator.apache.org/tutorials/unsupervised_learning/gan.html, retrieved on Oct. 10, 2018, 7 pages.

Nag, "Generative Adversarial Networks (GANs) in 50 Lines of Code (PyTorch)", Feb. 10, 2017, https://medium.com/@devnag/generative-adversarial-networks-gans-in-50-lines-of-code-pytorch-e81b79659e3f, retrieved on Oct. 10, 2018, 8 pages.

Theis et al., "A Note on the Evaluation of Generative Models", arXiv:1511.01844v3, Apr. 24, 2016, 10 pages.

Chen, "The Research on Barcode Localization Based on Regional Gradient Statistical Analysis and Convolutional Neural Networks", China Excellent Master' Thesis Database, Information Technology Series, pp. 1138-1142.

Machine Translated Chinese Search Report Corresponding to Application No. 201780072919 dated Nov. 19, 2020.

* cited by examiner

COMPUTING SYSTEMS WITH MODULARIZED INFRASTRUCTURE FOR TRAINING GENERATIVE ADVERSARIAL NETWORKS

RELATED APPLICATIONS

This application claims priority to and the benefit of U.S. Provisional Patent Application No. 62/582,142 filed on Nov. 6, 2017. U.S. Provisional Patent Application No. 62/582,142 is hereby incorporated by reference in its entirety.

FIELD

The present disclosure relates generally to machine learning. More particularly, the present disclosure relates to computing systems that provide a modularized infrastructure for training Generative Adversarial Networks.

BACKGROUND

Training a machine-learned model such as a neural network usually involves defining a loss function, which tells the model how close or far it is from its objective. For example, image classification networks are often given a loss functions that penalizes them for giving wrong classifications; a network that mislabels a dog picture as a cat will get a high loss. However, not all problems have easily-defined loss functions, especially if they involve human perception. Image compression, for instance, doesn't have a clearly defined loss function. Instead, most compression systems use a simple loss that ignores things about global structure or human perception. Similarly, text-to-speech systems try to produce audio that sounds 'real', but a definition of 'real sounding audio' is difficult to produce in practice.

Generative Adversarial Networks (GANs) offer a solution to the challenge of defining an explicit loss function. GANs are a machine learning technique that have led to improvements in a wide range of applications including generating images from text, superresolution, and helping robots learn to grasp. One reason GANs are so powerful is that they don't need a human user to manually specify or define a loss function that, for example, evaluates loss from the perspective of human perception. Instead, a GAN learns what to learn.

In particular, a GAN typically includes two competing networks that improve over time by trying to trick the other. A generator network attempts/learns to generate a plausible output, while a discriminator network attempts/learns to distinguish the output of the generator from real data.

However, GANs introduce new theoretical and practical challenges and have their own set of difficult engineering problems. As one example challenge, most machine learning infrastructure does not have built-in support for training multiple networks simultaneously. As another example challenge, GANs typically train through a minimax game rather than a standard optimization procedure. As a third example challenge, techniques and processes for evaluating the quality of a GAN do not currently exist in a meaningful way.

SUMMARY

Aspects and advantages of embodiments of the present disclosure will be set forth in part in the following description, or can be learned from the description, or can be learned through practice of the embodiments.

One aspect of the present disclosure is directed to a computer system. The computing system includes one or more processors and one or more non-transitory computer-readable media that collectively store: a first set of modularized infrastructure code executable by the one or more processors to define a generator network and a discriminator network of a generative adversarial network; a second set of modularized infrastructure code executable by the one or more processors to define a loss for the generator network and the discriminator network; a third set of modularized infrastructure code executable by the one or more processors to generate a training operation for the generator network and the discriminator network; and a fourth set of modularized infrastructure code executable by the one or more processors to perform the training operation. The computing system passes information between the sets of modularized infrastructure code using predefined interface data structures.

Another aspect of the present disclosure is directed to computer-implemented method to train a generative adversarial network. The method includes receiving, by one or more computing devices, user input that describes an input to the generative adversarial network. The method includes defining, by the one or more computing devices by executing a first set of modular infrastructure code, a generator network and a discriminator network of the generative adversarial network. The method includes defining, by the one or more computing devices by executing a second set of modular infrastructure code, a loss for the generator network and the discriminator network. The method includes generating, by the one or more computing devices by executing a third set of modular infrastructure code, a training operation for the generator network and the discriminator network. The method includes performing, by the one or more computing devices by executing a fourth set of modular infrastructure code, the training operation for the generator network and the discriminator network.

Another aspect of the present disclosure is directed to a non-transitory computer-readable medium that stores: a first set of modularized infrastructure code executable by one or more processors to define a generator network and a discriminator network of a generative adversarial network; a second set of modularized infrastructure code executable by the one or more processors to define a loss for the generator network and the discriminator network; a third set of modularized infrastructure code executable by the one or more processors to generate a training operation for the generator network and the discriminator network; and a fourth set of modularized infrastructure code executable by the one or more processors to perform the training operation. Information is passed between the sets of modularized infrastructure code using predefined interface data structures.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
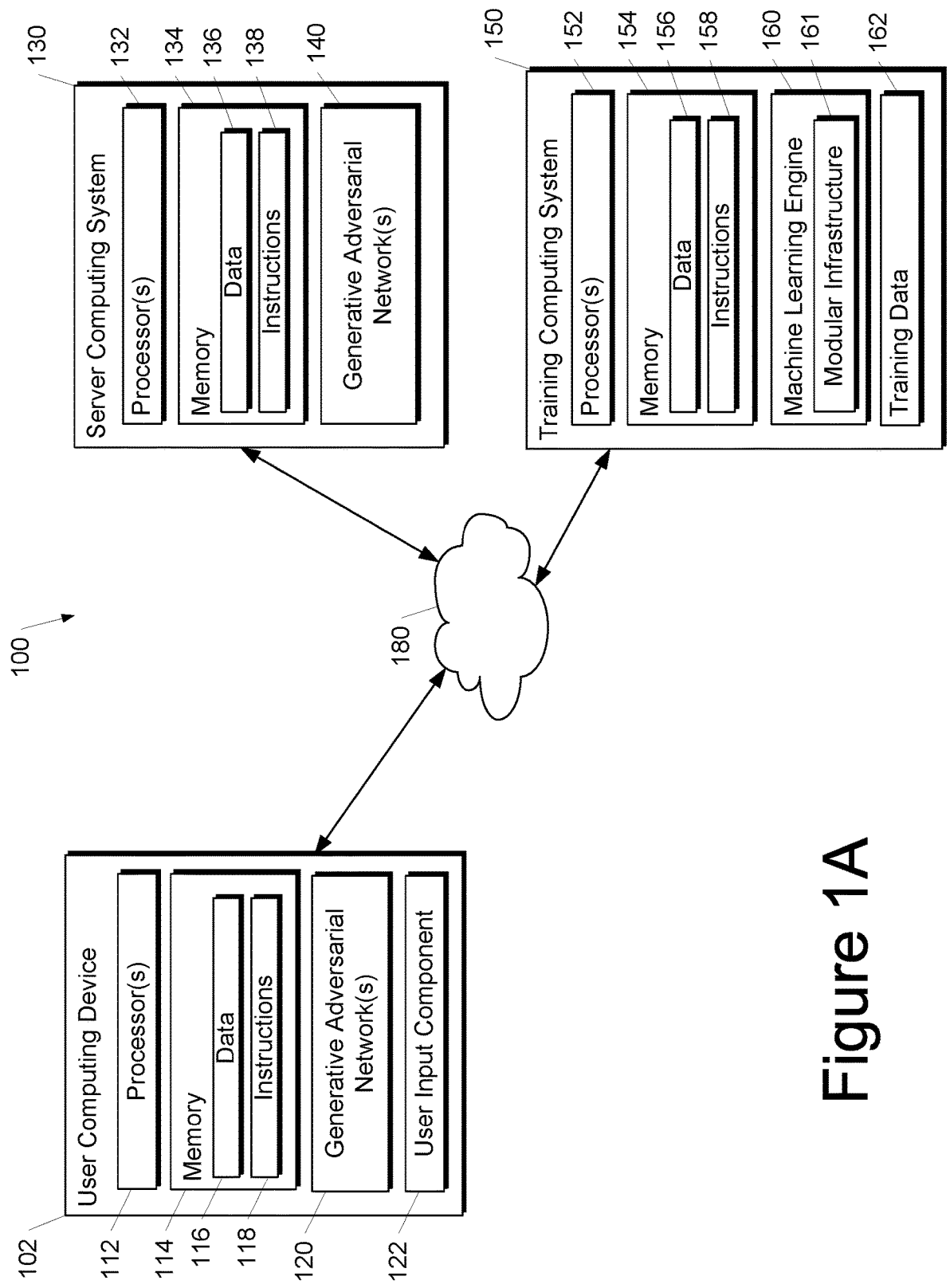
FIG. 1A depicts a block diagram of an example computing system that performs training of generative adversarial networks according to example embodiments of the present disclosure.

Reference numerals that are repeated across plural figures are intended to identify the same features in various implementations.

DETAILED DESCRIPTION

Overview

Example aspects of the present disclosure are directed to computing systems that provide a modularized infrastructure for training Generative Adversarial Networks (GANs). For example, the modularized infrastructure can include a lightweight library designed to make it easy to train and evaluate GANs. A user can interact with and/or build upon the modularized infrastructure to easily train GANs.

According to one aspect of the present disclosure, the modularized infrastructure can include a number of distinct sets of code that handle various stages of and operations within the GAN training process. The sets of code can be modular. That is, the sets of code can be designed to exist independently yet be easily and intuitively combinable. Thus, the user can employ some or all of the sets of code or can replace a certain set of code with a set of custom-code while still generating a workable combination.

More particularly, in some implementations, the modularized infrastructure can include a core that provides the main infrastructure needed to train a GAN. The training process can occur in four phases, and each phase can be completed by custom-code or by using a particular set of modularized infrastructure code included in the core. Thus, in some implementations, the core can include four sets of modularized infrastructure code that respectively handle each of the four phases.

In particular, in some implementations, a first set of modularized infrastructure code can be responsible for setting up the network architecture for the GAN. For example, the first set of modularized infrastructure code can define a generator network and a discriminator network. The generator network can take as input a single tensor input or a list of inputs. The discriminator network can take in the output of the generator network, and optionally the input to the generator as well. The first set of modularized infrastructure code can set up the connection between the input, generator, and discriminator.

A second set of modularized infrastructure code can define a loss for the GAN. For example, the second set of modularized infrastructure code can define a generator network loss and a discriminator network loss. The second set of modularized infrastructure code can include two parts: selection of a loss function (e.g., cross entropy, Wasserstein loss, Least Squares loss, etc.) and application of an arbitrary number of penalties (e.g., Wasserstein gradient penalty, mutual information penalty, etc.). The second set of modularized infrastructure code can also optionally (e.g., based on user-controlled settings) validate that the outputs of the first set of modularized infrastructure code match the required inputs for the selected loss function and penalties.

A third set of modularized infrastructure code can generate a training operation for the GAN. For example, the third set of modularized infrastructure code can define the operations that compute gradients and apply updates. The third set of modularized infrastructure code can employ an optimizer, and therefore the update rule to the model variables.

A fourth set of modularized infrastructure code can execute the training operation generated by the third set of modularized infrastructure code. For example, the fourth set of modularized infrastructure code can run the graphs in inference, compute the loss, compute the gradients, compute the updates, and apply the updates to the variables. The fourth set of modularized infrastructure code can require the number of generator steps to train versus discriminator steps. The training operations can be done simultaneously or in parallel.

According to another aspect of the present disclosure, the sets of modularized infrastructure code can pass information to each other using predefined interfaces which can, for example, take the form of predefined tuples. Each predefined interface can provide enough information to enable various downstream processes while providing a minimal representation, thereby enabling training and experimentation with reduced complexity. The modularized infrastructure can further include referenceable sets of code that correspond to well-tested and defined techniques such as GAN operations, normalization techniques, losses, and penalties.

According to another aspect of the present disclosure, the sets of modularized infrastructure code (e.g., the third and/or fourth set) can optionally enable simultaneous training of the generator network and the discriminator network. For example, the sets of modularized infrastructure code can enable simultaneous training of the generator network and the discriminator network in parallel and/or as a combination. Further, in some implementations, the sets of modularized infrastructure code can enable simultaneous training of the generator network and the discriminator network within a machine learning engine graph (e.g., a TensorFlow graph). As another example, the sets of modularized infrastructure code can enable alternating training of the generator network and the discriminator network within a machine learning engine graph (e.g., a TensorFlow graph).

More particularly, other GAN training schemes and systems typically train the generator network and the discriminator network in an alternating manner. This can require maintaining a record of which model is being trained and updating its parameters, which often results in a separate parameter update book keeping step that is distinct from other aspects of the training process. As a result, the alternating training paradigm is separated from the other stages of GAN training.

In contrast, the systems and methods of the present disclosure can enable simultaneous training of the generator network and the discriminator network (e.g., in parallel and/or as a combination). By enabling simultaneous training of the generator network and the discriminator network, the systems and methods of the present disclosure can eliminate the requirement of performing a separate parameter update book keeping step that is distinct from the training process as a whole. As a result, the training process can be performed more efficiently (e.g., with reduced computation and/or at an increased speed).

Furthermore, other GAN training techniques and systems typically require multiple session calls. This can result in the training system alternating back and forth between running machine learning engine graphs (e.g., TensorFlow graphs) and executing computations in a separate language (e.g., executing Python computations).

In contrast, the systems and methods of the present disclosure can enable training (e.g., simultaneous or alternating) of the generator network and the discriminator network within a machine learning engine graph (e.g., a TensorFlow graph). By performing most if not all of training computations within graph, the systems and methods can eliminate the overhead associated with alternating back and forth between running machine learning engine graphs (e.g., TensorFlow graphs) and executing computations in a separate language (e.g., executing Python computations). As a result, the training process can be performed more efficiently (e.g., with reduced computation and/or at an increased speed).

In some implementations, the modularized infrastructure can also provide well-tested features, losses, and/or evaluation metrics. In particular, the modularized infrastructure can further include predefined sets of feature code that correspond to features. Many common GAN operations and normalization techniques, such as instance normalization and conditioning, can be already implemented with working code and available for use (e.g., via inclusion of a reference call) by the user of the modularized infrastructure. Thus, the user can employ already-implemented tricks to stabilize and improve training.

The modularized infrastructure can further include predefined sets of loss code that correspond to losses. The user can employ already-implemented and well-tested losses and penalties, such as the Wasserstein loss, gradient penalty, mutual information penalty, etc., simply by including a reference to the corresponding set of loss code.

The modularized infrastructure can further include predefined sets of evaluation code that perform evaluation. The user can employ already-implemented and well-tested evaluation techniques such as Inception Score or Frechet Distance (e.g., with a pretrained Inception network) to evaluate the generative model (e.g., an unconditional generative model). The user can also supply and use a pretrained classifier for more specific performance numbers, or use other methods for evaluating conditional generative models. The modularized infrastructure can also enable the user to monitor and visualize GAN progress during training, and evaluate them.

The modularized infrastructure can further include illuminating examples that highlight the expressiveness and flexibility of the infrastructure. Thus, the user can see examples of how to use the modularized infrastructure to make GAN training easier, or use the more complicated examples to jumpstart their own project. In some implementations, the examples include unconditional and conditional GANs, InfoGANs, adversarial losses on existing networks, image-to-image translation, and/or other examples.

Thus, the modularized infrastructure can enable a user to easily train a GAN. In particular, the modularized infrastructure can enable a user to easily train generator and discriminator networks with well-tested, flexible library calls. The user can mix the modularized infrastructure, native machine learning engines (e.g., TensorFlow), and/or other custom frameworks.

The modularized infrastructure can allow algorithmic improvements to easily propagate to applications and lower the startup cost to experimentation. Improvements in the modularized infrastructure can automatically benefit and flow to all existing GAN training projects. Thus, improvements in the modularized infrastructure can quickly cascade to all GANs trained on the infrastructure.

With reference now to the Figures, example embodiments of the present disclosure will be discussed in further detail.

Example Devices and Systems

FIG. 1A depicts a block diagram of an example computing system 100 that performs training of GANs according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more Generative Adversarial Networks 120. For example, the Generative Adversarial Networks 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. One example Generative Adversarial Network 120 is illustrated in FIG. 2.

Figure 2:
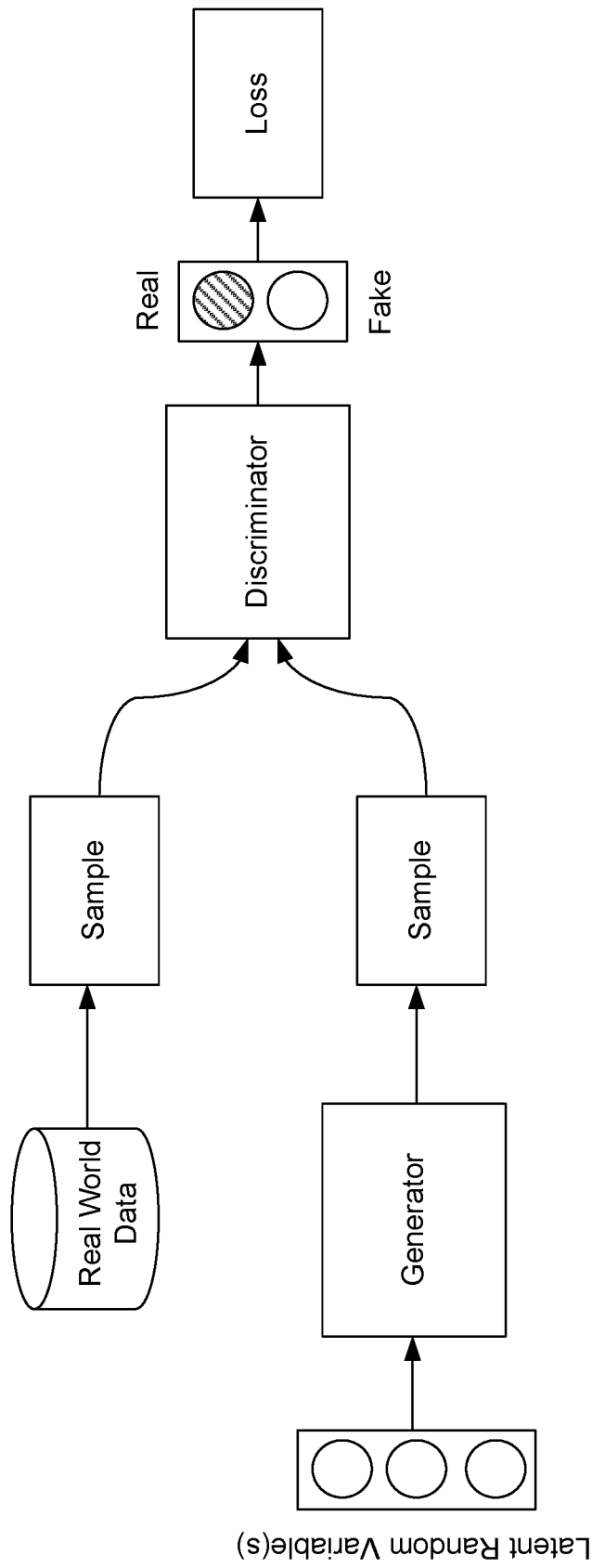
FIG. 2 depicts a block diagram of an example generative adversarial network according to example embodiments of the present disclosure.

Referring to FIG. 2, FIG. 2 illustrates an example of the GAN training paradigm in the unconditional case. The GAN includes two networks (the generator and the discriminator) that are typically trained in an alternating manner. In the generator train step, the discriminator variables are treated as constant and are used to calculate loss gradients with respect to generator variables. In the discriminator train step, the generator runs inference to create generated data samples that are used to calculate the discriminator loss. Two example infrastructure differences between GAN training and normal model training are: supporting various flavors of the alternating training paradigm; and allowing the discriminator loss to be a function of two inferences of the graph.

The generator and/or the discriminator can include various types of machine-learned models. Machine-learned models can include linear models and non-linear models. As examples, machine-learned models can include regression models, support vector machines, decision tree-based models, Bayesian models, and/or neural networks (e.g., deep neural networks). Neural networks can include feed-forward neural networks, recurrent neural networks (e.g., long short-term memory recurrent neural networks), convolutional neural networks or other forms of neural networks. Thus, although the generator and discriminator are sometimes referred to as "networks", this is for convenience. The generator and discriminator are not necessarily limited to being neural networks but can also include other forms of machine-learned models.

Referring again to FIG. 1A, in some implementations, the one or more Generative Adversarial Networks 120 can be received from the server computing system 130 over network 180, stored in the user computing device memory 114, and then used or otherwise implemented by the one or more processors 112. In some implementations, the user computing device 102 can implement multiple parallel instances of a single Generative Adversarial Network 120.

Additionally or alternatively, one or more Generative Adversarial Networks 140 can be included in or otherwise stored and implemented by the server computing system 130 that communicates with the user computing device 102 according to a client-server relationship. For example, the Generative Adversarial Networks 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned Generative Adversarial Networks 140. For example, the networks 140 can be or can otherwise include various machine-learned models. Example machine-learned models can include neural networks or other multi-layer non-linear models. Example neural networks include feed forward neural networks, deep neural networks, recurrent neural networks, and convolutional neural networks. One example Generative Adversarial Network 140 is discussed with reference to FIG. 2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a machine learning engine 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The machine learning engine 160 can perform a number of generalization techniques (e.g., weight decays, dropouts, etc.) to improve the generalization capability of the models being trained. The machine learning engine 160 can include one or more machine learning platforms, frameworks, and/or libraries, such as, for example, TensorFlow, Caffe/Caffe2, Theano, Torch/PyTorch, MXnet, CNTK, etc.

Figure 3:
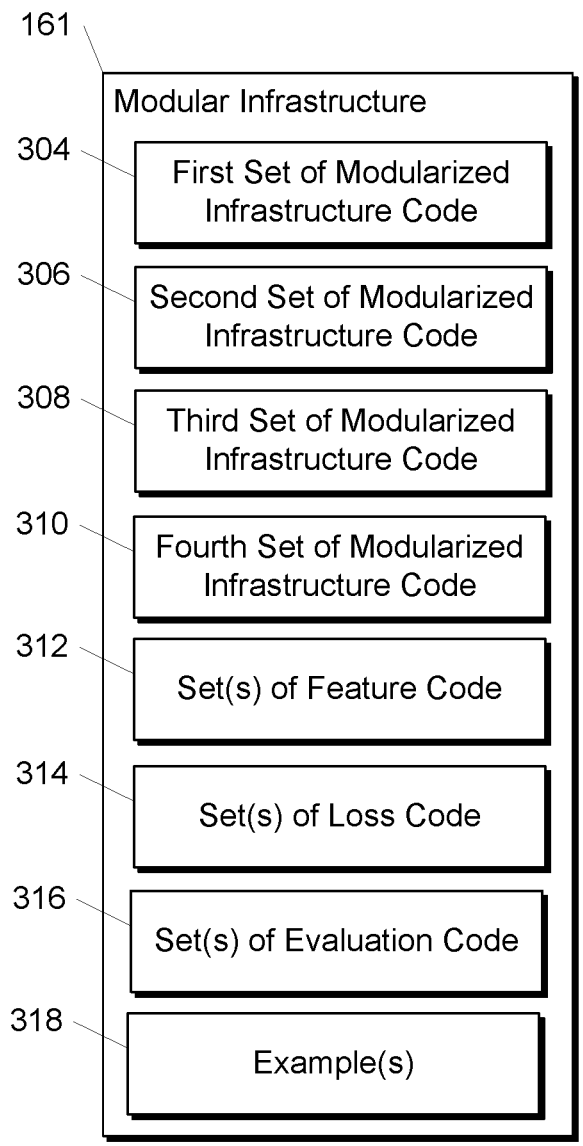
FIG. 3 depicts a block diagram of an example modularized infrastructure according to example embodiments of the present disclosure.

According to an aspect of the present disclosure, the machine learning engine 160 can include a modular infrastructure 161 that enables modularized training of the Generative Adversarial Networks 120 and/or 140. FIG. 3 provides a block diagram of an example modular infrastructure 161.

As illustrated in FIG. 3, the example modular infrastructure 161 includes a first set of modularized infrastructure code 304; a second set of modularized infrastructure code 306; a third set of modularized infrastructure code 308; and a fourth set of modularized infrastructure code 310.

The first set of modularized infrastructure code 304 can be responsible for setting up the network architecture for the GAN. For example, the first set of modularized infrastructure code 304 can define a generator network and a discriminator network. The generator network can take as input a single tensor input or a list of inputs. The discriminator network can take in the output of the generator network, and optionally the input to the generator as well. The first set of modularized infrastructure code 304 can set up the connection between the input, generator, and discriminator.

Table 1 provides a list of example outputs of the first set of modularized infrastructure code 304:

TABLE 1

| Output | Description |
| --- | --- |
| generator_inputs | The random noise source that acts as input to the generator |
| generated_data | The generated output data of the GAN |
| generator_variables | A list of all generator variables |
| generator_scope | Variable scope all generator variables line in |
| generator_fn | The generator function |
| real_data | A tensor or real data |
| discriminator_real_outputs | The discriminator's output on real data |
| discriminator_gen_outputs | The discriminator's output on generated data |
| discriminator_variables | A list of all discriminator variables |
| discriminator_scope | Variable scope all discriminator variables live in |
| discriminator_fn | The discriminator function |

Note that this general step (e.g., model creation) can be extended in various more-complicated cases. As one example, the InfoGAN paradigm could have the following be additional properties of the model creation step:

"""

An InfoGANModel contains all the pieces needed for InfoGAN training.

Args:

structured_generator_inputs: A list of Tensors representing the random noise that must have high mutual information with the generator output. List length should match 'predicted_distributions'.

predicted_distributions: A list of tf.Distributions. Predicted by the recognizer, and used to evaluate the likelihood of the structured noise. List length should match 'structured_generator_inputs'.

"""

The second set of modularized infrastructure code 306 can define a loss for the GAN. For example, the second set of modularized infrastructure code 306 can define a generator network loss and a discriminator network loss. The second set of modularized infrastructure code 306 can include two parts: selection of a loss function (e.g., cross entropy, Wasserstein loss, Least Squares loss, etc.) and application of an arbitrary number of penalties (e.g., Wasserstein gradient penalty, mutual information penalty, etc.). The second set of modularized infrastructure code 306 can also optionally (e.g., based on user-controlled settings) validate that the outputs of the first set of modularized infrastructure code 304 match the required inputs for the selected loss function and penalties.

As one example, the second set of modularized infrastructure code 306 can output an object with the following properties:

"""

GANLoss contains the generator and discriminator losses.

Args:

generator_loss: A tensor for the generator loss.

discriminator_loss: A tensor for the discriminator loss.

"""

The third set of modularized infrastructure code 308 can generate a training operation for the GAN. For example, the third set of modularized infrastructure code 308 can define the operations that compute gradients and apply updates. The third set of modularized infrastructure code 308 can employ an optimizer, and therefore the update rule to the model variables.

As one example, the third set of modularized infrastructure code 308 can output as follows:

"""

GANTrainOps contains the training ops.

Args:

generator_train_op: Op that performs a generator update step.

discriminator_train_op: Op that performs a discriminator update step.

global_step_inc_op: Op that increments the shared global step.

"""

The fourth set of modularized infrastructure code 310 can execute the training operation generated by the third set of modularized infrastructure code 308. For example, the fourth set of modularized infrastructure code 310 can run the graphs in inference, compute the loss, compute the gradients, compute the updates, and apply the updates to the variables. The fourth set of modularized infrastructure code 310 can require the number of generator steps to train versus discriminator steps. The training operations can be done simultaneously or in parallel.

According to another aspect of the present disclosure, the sets of modularized infrastructure code 304-310 can pass information to each other using predefined interfaces which can, for example, take the form of predefined tuples. Each predefined interface can provide enough information to enable various downstream processes while providing a minimal representation, thereby enabling training and experimentation with reduced complexity. The modularized infrastructure 161 can further include referenceable sets of code that correspond to well-tested and defined techniques such as GAN operations, normalization techniques, losses, and penalties.

According to another aspect of the present disclosure, the sets of modularized infrastructure code 304-310 (e.g., the third set 308 and/or the fourth set 310) can optionally enable simultaneous training of the generator network and the discriminator network. For example, the sets of modularized infrastructure code 304-310 can enable simultaneous training of the generator network and the discriminator network in parallel and/or as a combination. Further, in some implementations, the sets of modularized infrastructure code 304-310 can enable simultaneous training of the generator network and the discriminator network within a machine learning engine graph (e.g., a TensorFlow graph). As another example, the sets of modularized infrastructure code 304-310 can enable alternating training of the generator network and the discriminator network within a machine learning engine graph (e.g., a TensorFlow graph).

Appendix A of U.S. Provisional Patent Application No. 62/582,142 provides example code that can be included in the modularized infrastructure 161 (e.g., example code that can correspond to the sets of modularized infrastructure code 304-310). Appendix A of U.S. Provisional Patent Application No. 62/582,142 is fully incorporated by reference herein. Appendix A of U.S. Provisional Patent Application No. 62/582,142 is provided as examples of how aspects of the present disclosure can be implemented. Appendix A of U.S. Provisional Patent Application No. 62/582,142 is not the only way in which aspects of the present disclosure can be implemented. Thus, the present disclosure is not limited to the example implementations shown in Appendix A of U.S. Provisional Patent Application No. 62/582,142.

In some implementations, the modularized infrastructure 161 can also provide well-tested features, losses, and/or evaluation metrics. In particular, the modularized infrastructure 161 can further include predefined sets of feature code 312 that correspond to features. Many common GAN operations and normalization techniques, such as instance normalization and conditioning, can be already implemented with working code and available for use (e.g., via inclusion of a reference call) by the user of the modularized infrastructure 161. Thus, the user can employ already-implemented tricks to stabilize and improve training.

The modularized infrastructure 161 can further include predefined sets of loss code 314 that correspond to losses. The user can employ already-implemented and well-tested losses and penalties, such as the Wasserstein loss, gradient penalty, mutual information penalty, etc., simply by including a reference to the corresponding set of loss code.

Appendix B of U.S. Provisional Patent Application No. 62/582,142 provides an example set of loss code 314 that can be included in the modularized infrastructure. Appendix B of U.S. Provisional Patent Application No. 62/582,142 is fully incorporated by reference herein.

The modularized infrastructure 161 can further include predefined sets of evaluation code 316 that perform evaluation. The user can employ already-implemented and well-tested evaluation techniques such as Inception Score or Frechet Distance (e.g., with a pretrained Inception network) to evaluate the generative model (e.g., an unconditional generative model). The user can also supply and use a pretrained classifier for more specific performance numbers, or use other methods for evaluating conditional generative models. The modularized infrastructure can also enable the user to monitor and visualize GAN progress during training, and evaluate them.

The modularized infrastructure 161 can further include illuminating examples 318 that highlight the expressiveness and flexibility of the infrastructure. Thus, the user can see examples of how to use the modularized infrastructure to make GAN training easier, or use the more complicated examples 318 to jumpstart their own project. In some implementations, the examples 318 include unconditional and conditional GANs, InfoGANs, adversarial losses on existing networks, image-to-image translation, and/or other examples.

Appendix C of U.S. Provisional Patent Application No. 62/582,142 provides a set of examples 318 that can be included in the modularized infrastructure. Appendix C of U.S. Provisional Patent Application No. 62/582,142 is fully incorporated herein by reference.

Referring again to FIG. 1A, the machine learning engine 160 can train the Generative Adversarial Networks 120 and/or 140 based on a set of training data 162. The training data 162 can include, for example, real world data such as images, artwork, audio samples (e.g., speech samples, music samples, etc.), or other forms of real world data for which synthetically generated approximates are desired.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The machine learning engine 160 includes computer logic utilized to provide desired functionality. The machine learning engine 160 can be implemented in hardware, firmware, and/or software controlling a general purpose processor. For example, in some implementations, the machine learning engine 160 includes program files stored on a storage device, loaded into a memory and executed by one or more processors. In other implementations, the machine learning engine 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the machine learning engine 160 and the training dataset 162. In such implementations, the models 120 can be both trained and used locally at the user computing device 102. In some of such implementations, the user computing device 102 can implement the machine learning engine 160 to personalize the models 120 based on user-specific data.

Figure 1B:
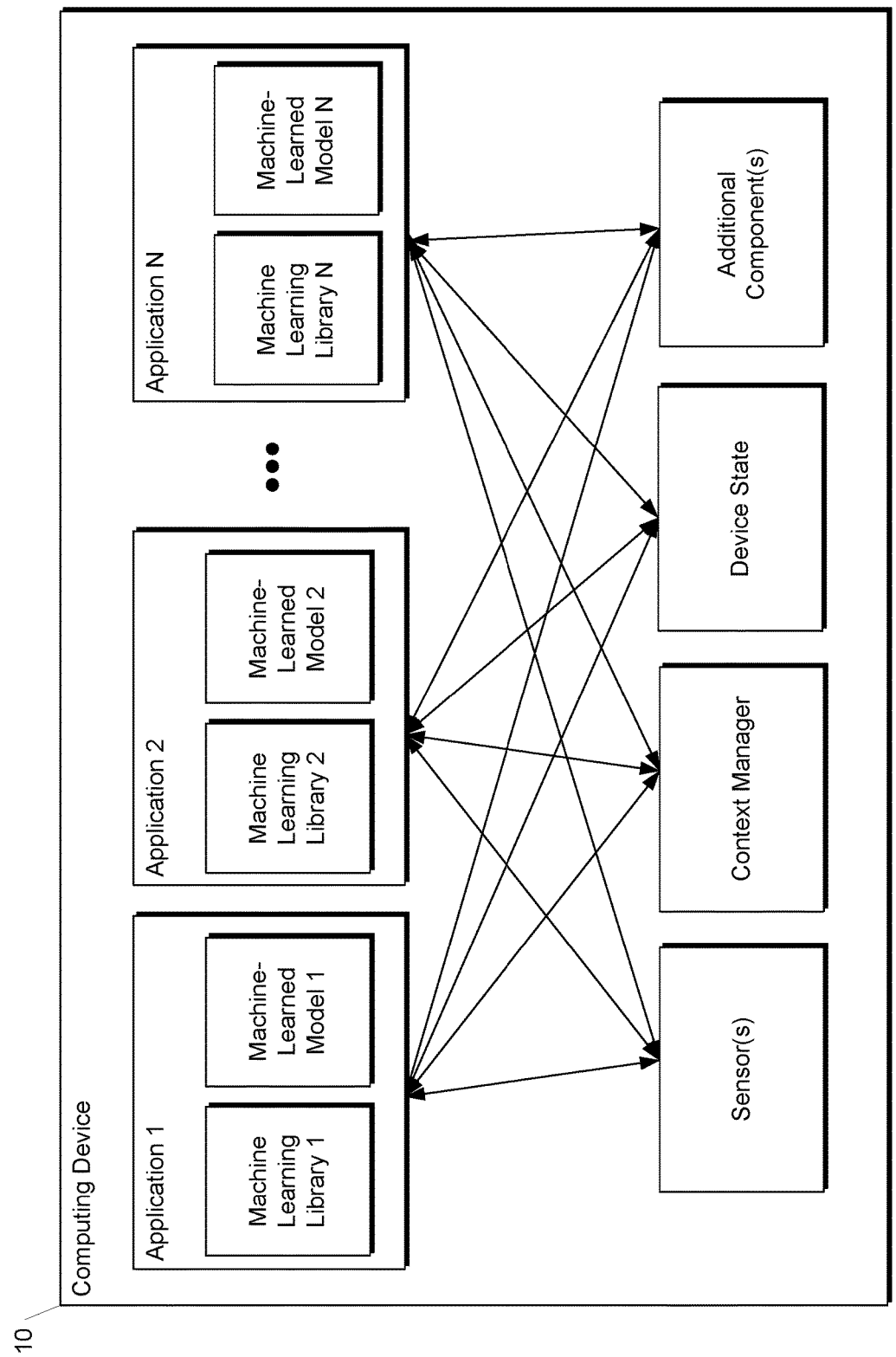
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
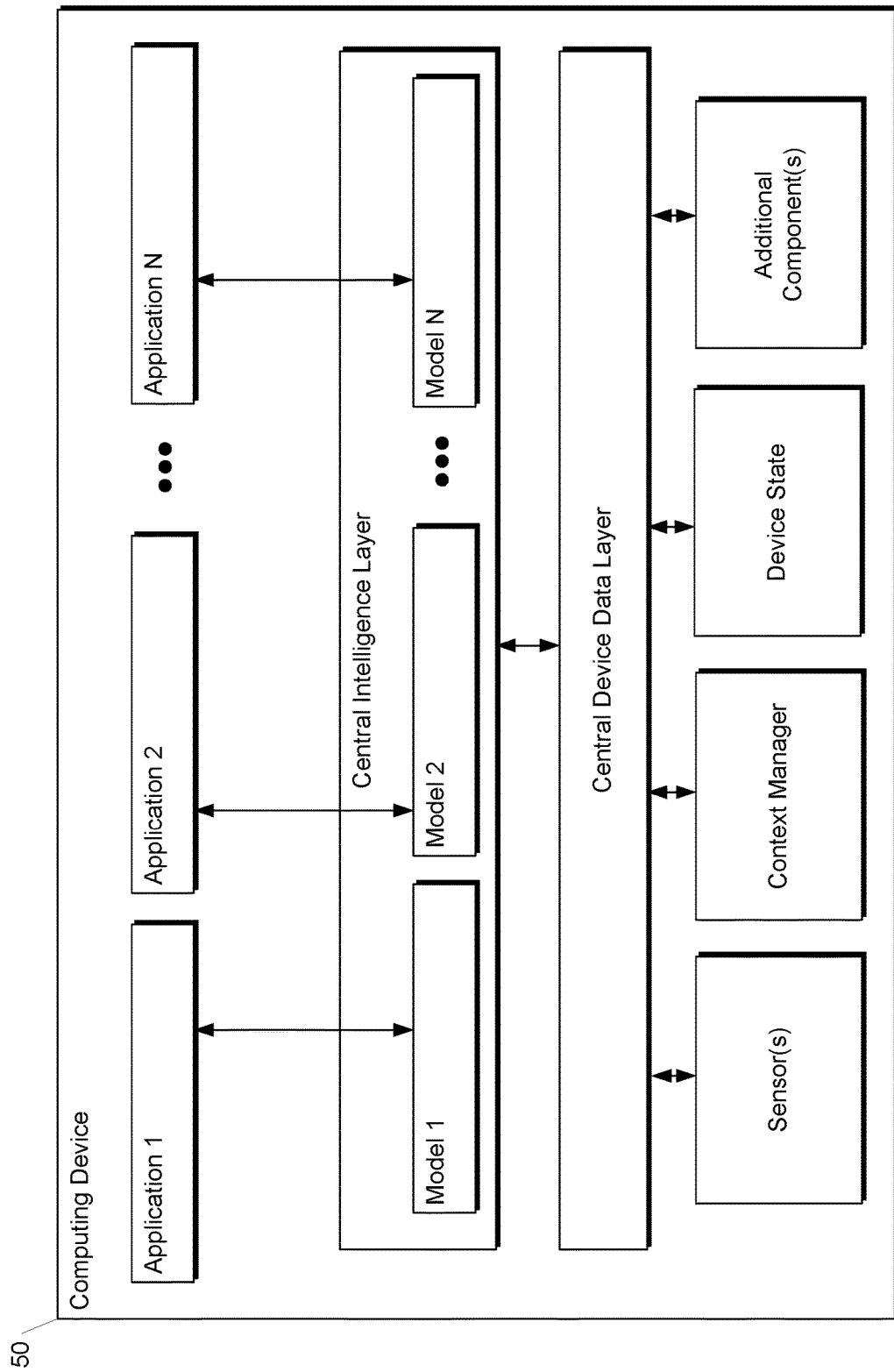
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 4:
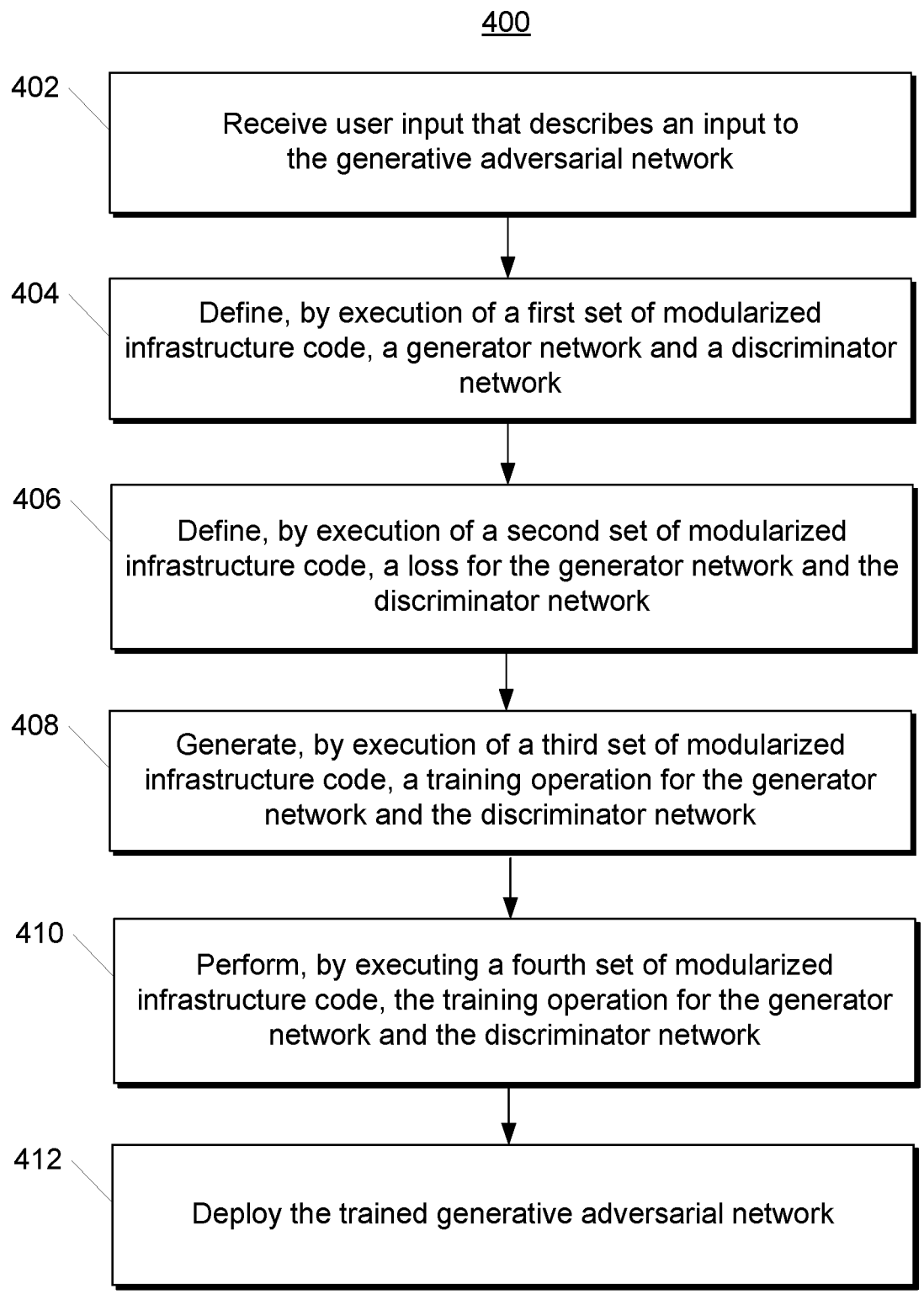
FIG. 4 depicts a flow chart diagram of an example method to train a generative adversarial network according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can receive user input that describes an input to a Generative Adversarial Network.

At 404, the computing system can define, by execution of a first set of modularized infrastructure code, a generator network and a discriminator network.

At 406, the computing system can define, by execution of a second set of modularized infrastructure code, a loss for the generator network and the discriminator network.

At 408, the computing system can generate, by execution of a third set of modularized infrastructure code, a training operation for the generator network and the discriminator network.

At 410, the computing system can perform, by executing a fourth set of modularized infrastructure code, the training operation for the generator network and the discriminator network.

At 412, the computing system can deploy the trained Generative Adversarial Network (e.g., at least the trained generator network).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system comprising:
one or more processors; and
one or more non-transitory computer-readable media comprising instructions that, when executed by the one or more processors, cause the one or more processors to perform a process, the process comprising:
defining, by executing a first set of modularized infrastructure code, a generator network and a discriminator network of a generative adversarial network;
defining, by executing a second set of modularized infrastructure code, a loss for the generator network and the discriminator network;
generating, by executing a third set of modularized infrastructure code a training operation for the generator network and the discriminator network; and
performing, by executing a fourth set of modularized infrastructure code, the training operation;
wherein the computing system passes information between the sets of modularized infrastructure code using predefined tuples providing information for downstream processes for training the generative adversarial network while representing said information with a minimal representation.

2. The computer system of claim 1, wherein the sets of modularized infrastructure code enable simultaneous training of the generator network and the discriminator network.

3. The computer system of claim 2, wherein the sets of modularized infrastructure code enable simultaneous training of the generator network and the discriminator network in parallel.

4. The computer system of claim 2, wherein the sets of modularized infrastructure code enable simultaneous training of the generator network and the discriminator network as a combination.

5. The computer system of claim 2, wherein the sets of modularized infrastructure code enable simultaneous training of the generator network and the discriminator network within a machine learning engine graph.

6. The computer system of claim 1, wherein the sets of modularized infrastructure code enable alternating training of the generator network and the discriminator network within a machine learning engine graph.

7. The computer system of claim 1, wherein at least one of the first, second, third, and fourth sets of infrastructure code is replaced with user-defined custom code.

8. The computer system of claim 1, wherein the one or more non-transitory computer-readable media further store:
one or more sets of feature code that respectively correspond to one or more previously-implemented generative adversarial network operations or normalization techniques;
wherein the one or more sets of feature code are referenced by the first, second, third, or fourth sets of modularized infrastructure code.

9. The computer system of claim 1, wherein the one or more non-transitory computer-readable media further store:
one or more sets of loss code that respectively correspond to one or more previously-implemented loss functions;

wherein the one or more sets of loss code are referenced by the first, second, third, or fourth sets of modularized infrastructure code.

10. The computer system of claim 9, wherein the one or more previously-implemented loss functions include a Wasserstein loss, a gradient penalty, or a mutual information penalty.

11. The computer system of claim 1, wherein the one or more non-transitory computer-readable media further store:
one or more sets of evaluation code, wherein the one or more sets of evaluation code are executed by the one or more processors to evaluate the generative adversarial network.

12. A computer-implemented method to train a generative adversarial network, the method comprising:
receiving, by one or more computing devices, user input that describes an input to the generative adversarial network;
defining, by the one or more computing devices by executing a first set of modular infrastructure code, a generator network and a discriminator network of the generative adversarial network;
defining, by the one or more computing devices by executing a second set of modular infrastructure code, a loss for the generator network and the discriminator network;
generating, by the one or more computing devices by executing a third set of modular infrastructure code, a training operation for the generator network and the discriminator network; and
performing, by the one or more computing devices by executing a fourth set of modular infrastructure code, the training operation for the generator network and the discriminator network,
wherein the computing system passes information between sets of modularized infrastructure code using predefined tuples providing information for downstream processes for training the generative adversarial network while representing said information with a minimal representation.

13. The computer-implemented method of claim 12, further comprising:
passing, by the one or more computing devices, information between the first, second, third, or fourth sets of modular infrastructure code using one or more predefined interface data structures.

14. The computer-implemented method of claim 12, wherein performing, by the one or more computing devices by executing the fourth set of modular infrastructure code, the training operation for the generator network and the discriminator network comprises simultaneously training, by the one or more computing devices by executing the fourth set of modular infrastructure code, the generator network and the discriminator network.

15. The computer-implemented method of claim 14, wherein simultaneously training, by the one or more computing devices by executing the fourth set of modular infrastructure code, the generator network and the discriminator network comprises simultaneously training, by the one or more computing devices by executing the fourth set of modular infrastructure code, the generator network and the discriminator network in parallel.

16. The computer-implemented method of claim 14, wherein simultaneously training, by the one or more computing devices by executing the fourth set of modular infrastructure code, the generator network and the discriminator network comprises simultaneously training, by the one or more computing devices by executing the fourth set of modular infrastructure code, the generator network and the discriminator network as a combination.

17. The computer-implemented method of claim 14, wherein simultaneously training, by the one or more computing devices by executing the fourth set of modular infrastructure code, the generator network and the discriminator network comprises simultaneously training, by the one or more computing devices by executing the fourth set of modular infrastructure code, the generator network and the discriminator network within a machine learning engine graph.

18. The computer-implemented method of claim 14, wherein simultaneously training, by the one or more computing devices by executing the fourth set of modular infrastructure code, the generator network and the discriminator network comprises alternatingly training, by the one or more computing devices by executing the fourth set of modular infrastructure code, the generator network and the discriminator network within a machine learning engine graph.

19. A non-transitory computer-readable medium that stores:
a first set of modularized infrastructure code that, when executed by one or more processors, define a generator network and a discriminator network of a generative adversarial network;
a second set of modularized infrastructure code that, when executed by the one or more processors, define a loss for the generator network and the discriminator network;
a third set of modularized infrastructure code that, when executed by the one or more processors, generate a training operation for the generator network and the discriminator network; and
a fourth set of modularized infrastructure code that, when executed by the one or more processors, perform the training operation;
wherein, when executed by the one or more processors, the sets of modularized infrastructure code pass information to each other using predefined tuples providing information for downstream processes for training the generative adversarial while representing said information with a minimal representation.

* * * * *